US011403016B1

(12) United States Patent
Ciubotariu (10) Patent No.: US 11,403,016 B1
(45) Date of Patent: Aug. 2, 2022

(54) OPTIMIZING SNAPSHOT CHANGED BLOCKS METADATA QUERYING

(71) Applicant: Amazon Technologies, Inc., Seattle, WA (US)

(72) Inventor: Mircea Ciubotariu, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/874,903

(22) Filed: May 15, 2020

(51) Int. Cl.
*G06F 12/00* (2006.01)
*G06F 3/06* (2006.01)
*G06F 11/14* (2006.01)
*G06F 9/54* (2006.01)

(52) U.S. Cl.
CPC .............. *G06F 3/064* (2013.01); *G06F 3/067* (2013.01); *G06F 3/0619* (2013.01); *G06F 3/0631* (2013.01); *G06F 9/54* (2013.01); *G06F 11/1435* (2013.01); *G06F 2201/84* (2013.01)

(58) Field of Classification Search
None
See application file for complete search history.

(56) References Cited

U.S. PATENT DOCUMENTS

2002/0065985 A1\* 5/2002 Garnett ............... G06F 13/4027
711/117
2010/0077165 A1\* 3/2010 Lu ....................... G06F 11/1451
711/162

\* cited by examiner

*Primary Examiner* — Daniel D Tsui
(74) *Attorney, Agent, or Firm* — Nicholson De Vos Webster & Elliott LLP (57) ABSTRACT

Techniques for optimizing snapshot changed blocks metadata querying are described. A method of optimizing snapshot changed blocks metadata querying comprises receiving a request to identify one or more changed blocks of a block storage volume in a storage service of a provider network, identifying at least one changed cluster of blocks of the storage volume, the at least one cluster of blocks comprising a plurality of blocks of the storage volume, and identifying at least one changed block from the plurality of blocks associated with the at least one changed cluster.

19 Claims, 8 Drawing Sheets

OPTIMIZING SNAPSHOT CHANGED BLOCKS METADATA QUERYING

BACKGROUND

Block storage services can make block storage volumes available for customers to use for storing data. The block storage service divides the customer data into blocks which may then be stored on storage media that back the block storage volumes. Since the storage volumes can be quite large (e.g., 16 TB or greater), the block size implemented by storage services is generally kept relatively large (e.g., 512 KB), which can be inefficient.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for optimizing snapshot changed blocks metadata querying. According to some embodiments, data may be divided into blocks and stored in a block storage volume. Each block of a block storage volume can be numerated from block 0 to N-1 (or other unique identifier). A block storage service can publish an interface, such as an application programming interface (API), which allows for the block storage service to be queried using a block identifier and to return whether the block has changed from a previous point in time. For example, snapshots of a block storage volume can be maintained which capture the state of the block storage volume at particular points in time. Using the API, a current state of a block can be determined to be changed as compared to a previous snapshot, or between two snapshots.

Traditionally, since the storage volumes can be quite large (e.g., 16 TB or greater), the block size has been kept relatively large (e.g., 512 KB) in order to keep iterations over such blocks to identify changed blocks from overwhelming system resources. Identifying a change block requires a separate API call for each block, therefore smaller block sizes would require significantly more network traffic than larger block sizes. However, most file systems use 4 KB sized blocks to align with the block size of physical media. Embodiments enable smaller block sizes to be used efficiently by organizing blocks into clusters of blocks, where each cluster includes a predefined number of blocks. For example, if a cluster includes 8192 blocks, then one cluster of 4 KB blocks covers a 32 MB area of the volume. Consequently, rather than iterating through each individual block, clusters can be iterated through until a changed cluster is identified and then only the blocks of that cluster need to be further iterated through. Because very few blocks tend to change between snapshots, this leads to a significant reduction in the number of blocks that have to be iterated through, reducing the resources required to track changed blocks.

Figure 1:
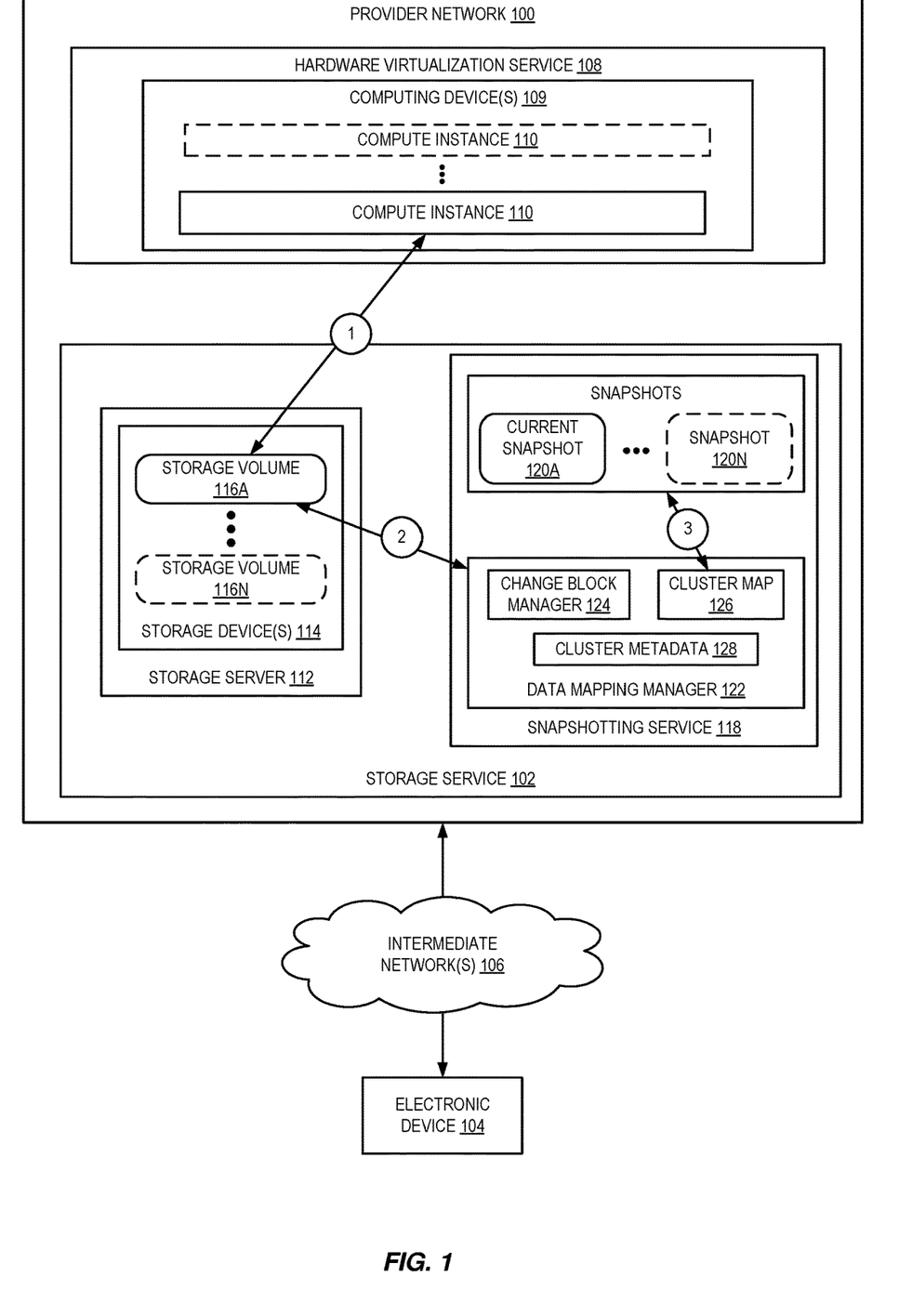
FIG. 1 is a diagram illustrating an environment for optimizing snapshot changed blocks metadata querying according to some embodiments.

FIG. 1 is a diagram illustrating an environment for optimizing snapshot changed blocks metadata querying according to some embodiments. A provider network 100 can include a storage service 102 that provides persistent block storage volumes (for example, storage volumes 114) for use with various types of compute instances and other computing resources in the provider network 100. In general, each storage volume can provide any amount of storage capacity depending on a customer's needs (for example, a provider network 100 may provide storage volumes of various sizes). Once a storage volume is created at a storage service 102, it can be attached to a compute instance (for example, a compute instance 110 hosted by a computing device 109 managed by a hardware virtualization service 108). Once a storage volume 114 is attached to a compute instance, the volume appears to the compute instance as a mounted device similar to any hard drive or other block device. At that point, a compute instance can interact with the volume just as it would with a local drive, formatting it with a file system or installing applications on it directly.

Typically, a storage volume 114 is attached to only one compute instance at a time, but many storage volumes 114 can be attached to a single compute instance. However, in some cases, a single storage volume 114 can be attached to two or more separate compute instances either permanently or temporarily (for example, during a process for migrating a compute instance from one computing device to another). In some embodiments, a storage volume 114 can be used as a boot partition for a compute instance 110, which enables users to preserve boot partition data beyond the life of a compute instance 110. In some embodiments, a single storage volume 114 can be stored as multiple partitions across two or more separate storage servers 110. In this case, a computing device 109 hosting a compute instance that attaches a storage volume 114 stored across multiple storage servers 112 can establish a separate connection with each of the respective storage servers and can manage I/O interactions with the storage volume for the compute instance.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 may be part of, or serve as a front-end to, a control plane 102 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The example shown in FIG. 1 includes several compute instances 110 managed by a hardware virtualization service 108, at least one of which has attached one or more storage volumes 116A-N managed by a storage service 102. As shown, each of the compute instances 108 can be hosted by a computing device 109 along with other compute instances on the same computing device, or a compute instance 108 can be the only compute instance hosted by a computing device. A storage server 114 can host any number of separate storage volumes 116A-N, which can be stored at any number of underlying storage devices 114 (for example, on hard disk drives (HDDs), solid-state drives (SSDs), or any other type of storage devices or combinations thereof). As indicated above, in some examples, a storage volume can also be stored across one or more separate storage servers 112.

In some embodiments, some or all of the computing devices 109 of the hardware virtualization service 102 include one or more of hardware processing elements, system memory, interconnects, one or more I/O proxy devices (each of which includes one or more separate hardware processing elements), and optionally one or more local data storage devices.

In an embodiment, a hardware processing element is generally any type of processor capable of executing instructions. For example, in various embodiments, a hardware processing element is a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements may commonly, but not necessarily, implement the same ISA. In embodiments with multiple hardware processing elements, each processing element can have a dedicated bank of system memory or share system memory with other hardware processing elements. In some embodiments, a hardware processing element accesses system memory via a memory bus or via an interconnect. A hardware processing element can include one or more processor cores, each having one or more levels of dedicated or shared cache (for example, L1 cache, L2 cache, and so forth).

In an embodiment, system memory stores program instructions and other data accessible by hardware processing elements. In other embodiments, program instructions and/or data can be received, sent, or stored on different types of computer-accessible media. In various embodiments, system memory is implemented using any suitable computer-accessible storage medium. Generally speaking, a computer-accessible storage medium can include non-transitory storage media or memory media such as magnetic or optical media, for example, a disk or DVD/CD coupled to computer system via an interconnect. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a computing device may access program instructions and data from a remote computer-accessible storage medium via the computer-accessible media.

In an embodiment, a computing device 109 optionally includes one or more network interfaces that allow data to be exchanged between the computing device and other electronic devices attached to a network or networks, such as other computing devices 109, storage servers 112, or any other hardware within a provider network 100 of which the computing device is a part, or with other computing devices external to the provider network. In some embodiments, a computing device 109 includes one or more I/O proxy devices, each including its own one or more network interfaces that may be separate from other network interfaces of the computing device 109. In various embodiments, a network interface of a computing device 109 or a network interface of an I/O proxy device supports communication via any suitable wired or wireless data network, such as Ethernet (for example, 802.3), 802.11, IP-based networks, Fiber Channel, Infiniband, and the like. These network interfaces may support communication via telecommunications/telephony networks such as analog voice networks or digital fiber communications networks any other suitable type of network and/or protocol.

In an embodiment, a computing device 109 includes interconnects which coordinate I/O traffic between components of the device, such as between hardware processing elements, memory, network interfaces, I/O proxy devices, and any other components that may be coupled to interconnects. Interconnects generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple different interconnects may couple components of a computing device 109. For example, some components may be connected with an I2C bus, others with a PCI bus, and others with both the PCI bus and the I2C bus. In some embodiments, bridges relay communications between different types of interconnects (for example, from one device on a first interconnect, through a bridge, to another device on a second interconnect).

In some embodiments, the hardware processing elements of a computing device 109 can include one or more special purpose (SP) processors. In embodiments with multiple SP processors, each SP processor may have a dedicated bank of memory or may share memory with other SP processors. Each SP processor might be an accelerator, coprocessor, field-programmable gate array (FPGA), application-specific integrated circuit (ASIC), or other processing device that can perform specialized operations (for example, graphics rendering, encryption and decryption, and so forth). A computing device 109 can include one or more than one type of SP processor.

In some embodiments, a computing device 109 can include one or more local data storage devices. In some embodiments, local data storage devices provide block storage via one or more logical volumes to software executing on the computer system, including to one or more compute instances 110 that may be virtualized on a computing device 109. Hardware processing elements and/or other devices (for example, direct memory access (DMA) controllers, and so forth) can access local storage volume(s) to store and retrieve code and/or data. Local data storage devices generally include non-transitory computer-readable media, such as magnetic disks, optical disks, flash memory devices, phase-change memory devices, RAM, ROM, and the like.

In some embodiments, a computing device 109 can additionally or alternatively access one or more remote and network-accessible data storage devices (for example, storage device 114) via one or more networks. These remote, network-accessible data storage devices similarly can provide block storage via logical volumes (for example, storage volumes 116A-N) to software executing on the computing device 109, including to compute instances 110 running on the device. In some embodiments, the use of network-accessible data storage devices 114 is managed by a storage service 102 of a provider network 100. In some embodiments, a computing device 109 includes one or more other I/O devices that can store, process, and/or communicate code and/or data for the computing device.

A storage server 112 includes one or more storage volumes, each of can be attached to an instance running on a computing device 109. For example, a compute instance can include one or more block device mappings, each corresponding to a storage volume 116A-N hosted by a storage server 114. In an embodiment, the block device mappings generally define the block storage devices that are attached to a compute instance. In some examples, block device mappings can be specified as part of an image used to launch a compute instance so that the block device mappings are used by any instances launched based on the image. Alternatively, block device mappings can be specified when a compute instance is launched or at any point after a compute instance is launched, thereby causing the compute instance to attach the block storage volumes specified by the block device mappings. As indicated above, once a storage volume 116A-N is attached to a compute instance via a block device mapping, the storage volume 116A-N can be mounted by the compute instance so that the compute instance can access the storage volume. A storage volume 116A-N can also be detached from a compute instance to which it is attached, at which point the compute instance can no longer access the storage volume.

In the example of FIG. 1, at numeral 1, a storage volume(s) can be attached to a, compute instance 110. The compute instance can read data from and write data to the attached volume(s). In an embodiment, the process of attaching a storage volume 116A-N to a compute instance 110 involves creating a network-based communication channel between a computing device 109 hosting the compute instance 110 and a storage server 114 (or creating multiple connections if the volume is stored across multiple storage servers). This connection between a computing device 109 and a storage server 112 can be implemented in various ways, and can be based on a variety of different protocols (for example, the Transmission Control Protocol (TCP) or any other data exchange protocols). For example, at the computing device 109, the logic for handling such connections in some architectures is offloaded from the hardware exposed to the compute instances 110 and onto an "offload card". In this embodiment, software on an offload card can be responsible for both sending and receiving storage I/O traffic to/from storage servers 112, in addition to tasks like establishing and maintaining the network connections with the storage servers 112, identifying which of the various storage servers 112 is responsible for managing the storage volumes 114 (or portions of a storage volume) that are used by various compute instances 110 running on the computing device 109, among other operations. In other embodiments, the management of connections 118 between computing devices 106 and storage servers 112 can be implemented at the client-side by a hypervisor, for example, in a privileged "host domain" managed by the hypervisor, by individual compute instance 110, or by any other software or computing device system component.

In an embodiment, a storage service 102 generally includes a fleet of purpose-built storage servers. These storage servers similarly can comprise various hardware platforms (some of which, for example, may include one or more I/O proxy cards and other possible components described above in connection with computing devices) and are generally managed on servers that are independent of a hardware virtualization service 102 and other services. The management of the computing device-storage server connections similarly can be implemented at the server-side at I/O proxy cards, by hypervisors or other software running on the storage servers, or by other server components depending on particular hardware platforms used.

Storage service 102 may include a snapshotting service 118 which maintains point-in-time snapshots 120A-120N of storage volumes. A user, such as the owner or administrator of the storage volume(s), can choose to enable snapshotting of their storage volume(s) with the snapshotting service 118 of the storage service 102. In some embodiments, these snapshots may be stored in an object data store provided by storage service 102, or other storage location, and may be used to backup a storage volume at a particular point in time. Snapshots may be incremental backups, which means that only the blocks on the device that have changed after a most recent snapshot are updated in each snapshot. Each snapshot may include all of the information that is needed to restore a storage volume to the time when the snapshot was created. For example, each snapshot may indicate for each block where the data for that block is stored. This may include pointing to a previous snapshot for blocks which have not changed since a previous snapshot.

Compute instance 110 can read from, and write to, the storage volume 116A. When the compute instance reads from the storage volume, the storage service can determine which blocks are being read by the read operation, identify where the data associated with those blocks are stored, and return the data. If less than a full block of data is being read, the storage service can trim the data being returned. Similarly, if data is written to the storage volume, the storage service can determine which blocks of the storage volume that write belongs to, store the data being written to a storage location, and update a data mapping manager 122 at numeral 2 with the updated location of the data for those blocks. The data mapping manager 122 can track where the data for each block is actually stored. For example, initially in an empty volume, all of the blocks may map to the same storage location. When data is written to the volume, the block(s) to which the write occurs are mapped to a new storage location that includes the newly written data. In some embodiments, change block manager 124 can identify write operations to particular blocks and update cluster map 126 associated with the changed block(s) and changed cluster(s). This cluster map may be maintained as a map, array, database, or other queryable data structure which identifies, for each block, where the data for that block is stored in storage service 102. In some embodiments, cluster metadata 128 may include a flag for each cluster and block, indicating whether that cluster or block is dirty (e.g., if the cluster or a block included therein has changed since a previous snapshot). At numeral 3, a snapshot of a storage volume can be captured. In some embodiments, the snapshot may comprise the cluster map 126 for the current state of the storage volume. As discussed, the cluster metadata may identify where the data for each block of a storage volume is stored.

Figure 2:
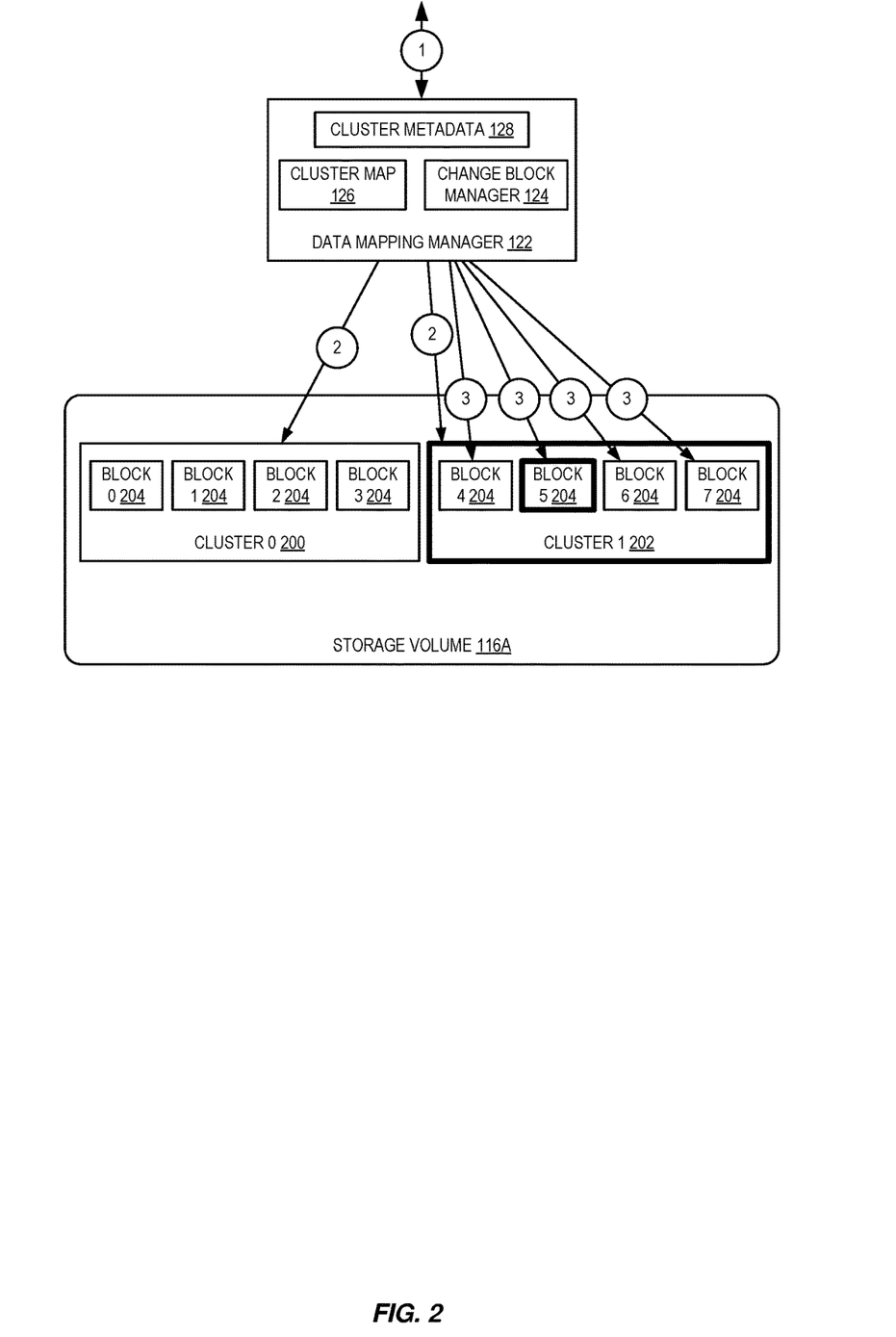
FIG. 2 is a diagram illustrating iterating over clusters of blocks according to some embodiments.

FIG. 2 is a diagram illustrating iterating over clusters of blocks according to some embodiments. As shown in FIG. 2, a storage volume 116A may include a plurality of blocks 204, such as blocks 0-7. In accordance with an embodiment, multiple blocks may be combined to form a cluster of blocks. For example, blocks 0-3 can be logically combined to form cluster 0 200 and blocks 4-7 can be logically combined to form cluster 1 202. A storage volume may include many millions or billions (or more) blocks, depending on the storage volume size and the block size, though for simplicity's sake eight blocks are shown in the example of FIG. 2. Additionally, the number of blocks which logically form a cluster may vary depending on implementation or may be a customizable value set by a volume owner, administrator, or other user or entity. For example, the cluster size may be selected based on performance requirements which may vary from user to user, or application to application.

At numeral 1, a request may be received to determine whether a block has changed as compared to an earlier state. As discussed, this request may be an API request which may identify the block, by block number, and may optionally identify a snapshot to which to compare the current state of the block. If no snapshot is identified, then the most recent snapshot may be used. In some embodiments, the request may identify one or more The request may originate from the storage service 102 itself, from a customer (e.g., via electronic device 104), or from an application (e.g., an application in provider network 100 or external to provider network 100 received via intermediate network 106).

The data mapping manager can more efficiently identify which blocks have changed using cluster map 126, as discussed. In the past, the data mapping manager would have to iterate over every block of the storage volume to identify which blocks have changed. This is inefficient and leads to a high amount of network traffic. However, by grouping the blocks into clusters, in the example of FIG. 2, the changed blocks can be identified in two iteration: a first iteration shown at numeral 2 of the clusters, and a second iteration shown at numeral 3 of the blocks of cluster 1. In the first iteration, cluster 0 is determined not to have changed and cluster 1 is determined to have changed (as indicated by the heavy border of cluster 1). Because cluster 0 has not changed, the blocks belonging to cluster 0 can be ignored and only blocks 4-7 are iterated through, identifying block 5 as the changed block. As discussed, the cluster size can be tuned depending on performance requirements. For example, if a cluster includes 8192 4 KB blocks, then the cluster occupies 32 MB of storage space. This is significantly larger than the previous block size of 512 KB and saves significant processing resources when a cluster can be ignored. In various embodiments, clusters may be configured to include different amounts of blocks (e.g., the cluster size) depending on performance requirements for different users and/or different applications. Cluster sizes may vary based on application, user preferences, system resources, etc. and may generally range between 1024 blocks to 8192 blocks, though other cluster sizes may also be implemented. For example, one user's storage volumes may use a cluster size of 1024 blocks, while a different user's storage volumes may use a cluster size of 8192 blocks. In some embodiments, the response to the API request received at numeral 1 can be a binary response indicating whether a particular block is dirty or can identify one or more blocks within a given cluster that have changed. In some embodiments, the logical block size used by the storage service can be configured based on performance requirements. For example, a 4 KB block size may be used to align with the 4 KB memory page size implemented by physical media and operating systems. Larger logical block sizes, such as 512 KB, can lead to inefficiencies. For example, a 512 KB block may include a large number of small sized objects. If any one of those objects is changed, then the whole block is changed and every object stored therein may be labeled as dirty, requiring all of these objects to be inspected.

Figure 3:
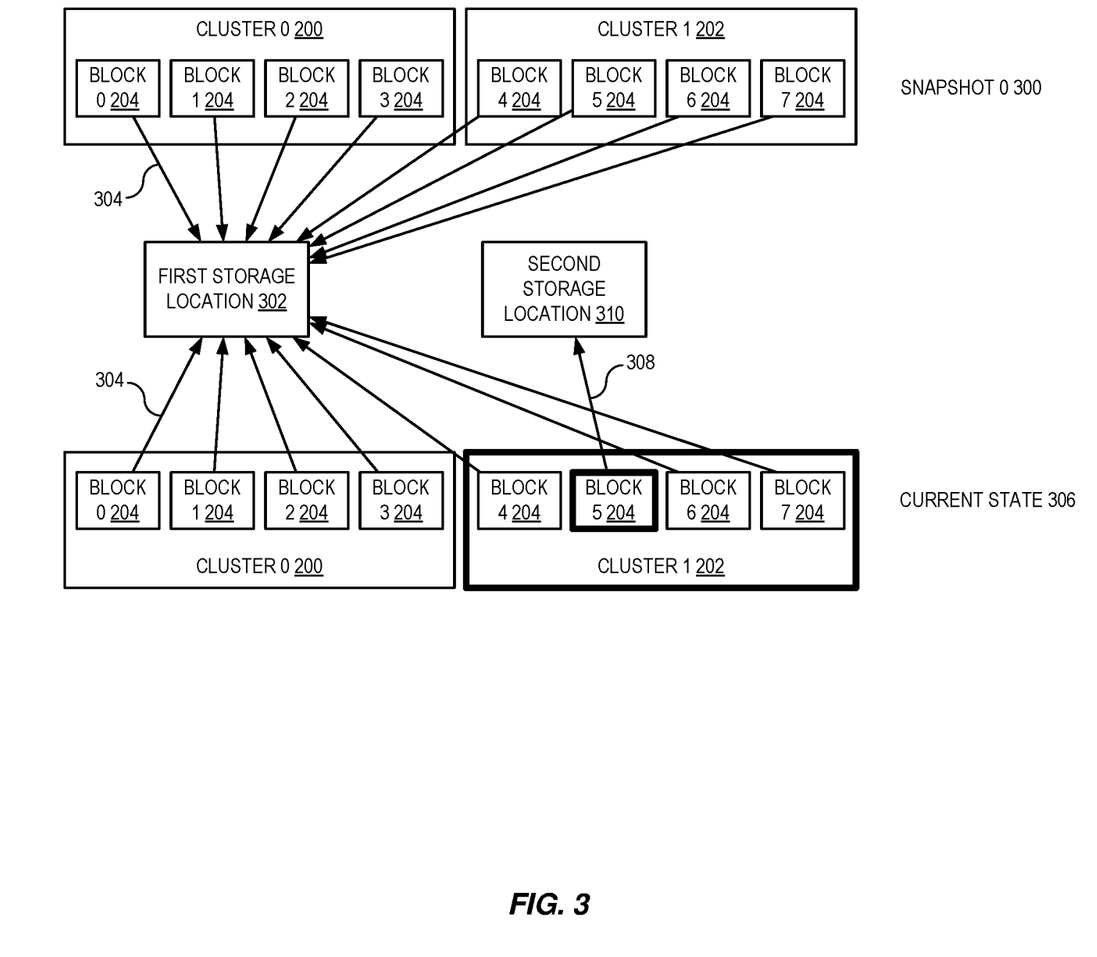
FIG. 3 is a diagram illustrating changed blocks and clusters according to some embodiments.

FIG. 3 is a diagram illustrating changed blocks and clusters according to some embodiments. As discussed, a storage volume can be divided into a plurality of blocks. As data is stored to the storage volume, the data is divided into blocks and stored to blocks of the storage volume. The initial state of an empty volume, as shown at snapshot 0 300, may include a plurality of blocks 204 combined into two clusters, cluster 0 200 and cluster 1 202. Each block may map 304 to a first storage location 302. The storage location may be a storage location in storage service 102, such as an object storage location, another storage volume, a physical data store, or other storage location. When new data is written to the storage volume, that new data is added to one or more blocks of the storage volume and the current state 306 of the storage volume changes. As shown in FIG. 3, new data may be written to block 5. This data can be added to a second storage location 308 and the mapping 310 for block 5 can be updated to reflect the new storage location. In some embodiments, the first location and second location may be in the same virtualized data store (e.g., a folder or "bucket", a virtualized volume, a database, etc.). The mappings 304 for the unchanged blocks remain the same, pointing to the first storage location 302.

These mappings 304, 308 may be maintained in cluster map 126, as discussed. The cluster map may be a queryable data structure (e.g., a database, array, etc.) which can receive a block identifier and return the location of the data for that block. For example, when a compute instance requires data for a particular file, the storage service can identify the block(s) to which the file belongs, then identifies the location of the data using the cluster map, and then returns the data for the block(s). If less than a full block is requested, the data may be trimmed prior to being returned. Any time data is written to the volume, the cluster map can be updated to identify the location of the newly written data for the changed blocks, and the cluster metadata can be updated to indicate that the block is changed and the cluster to which the block belongs is changed. When a new snapshot of the volume is captured, the current state 306 of the volume, e.g., the cluster map and metadata, can be recorded.

Figure 4:
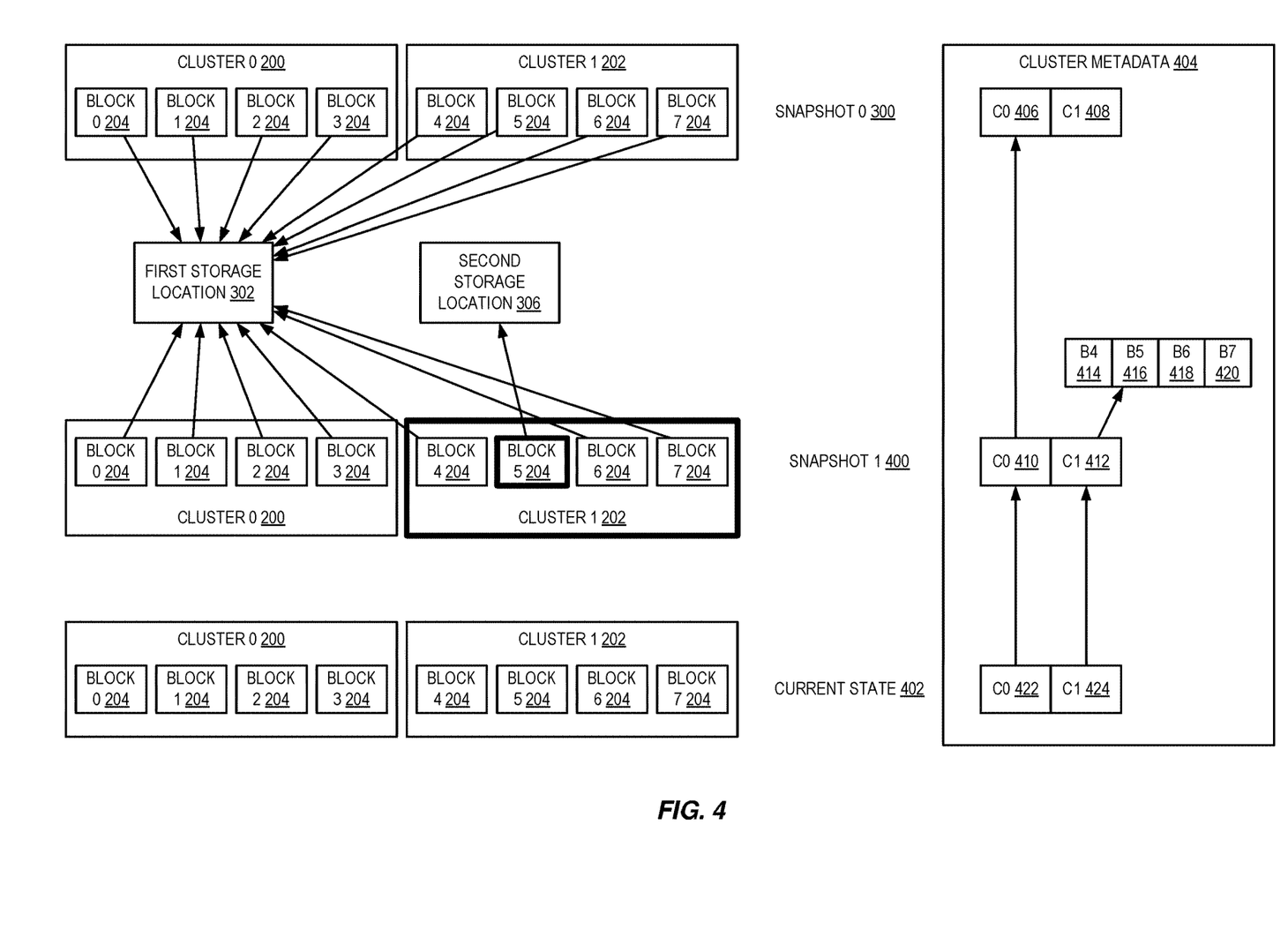
FIG. 4 is a diagram illustrating cluster metadata across multiple snapshots according to some embodiments.

FIG. 4 is a diagram illustrating cluster metadata across multiple snapshots according to some embodiments. In the example of FIG. 4, the state of a storage volume is shown across snapshot 0 300, snapshot 1 400, and current state 402. This state is reflected in cluster metadata 404. Each snapshot only has to keep track of what data has changed from a previous snapshot. If a block has not changed, then its data can be identified using a previous snapshot. The cluster metadata can include metadata for each cluster and metadata for each block. In the initial state of the volume, snapshot 0 300, the cluster metadata can include a metadata structure, such as a bitmap, for cluster 0 and cluster 1, with bits for C0 406 and C1 408. In the initial state, no blocks have changed, so storage space does not need to be allocated for the bits. The cluster map at snapshot 0 is current and all blocks map to the first storage location. As discussed, in snapshot 1 400, data may be written to the storage volume which causes block 5 to change. The mapping for block 5 is updated to point to second storage location 306. The cluster metadata can also be updated to reflect the change. Because cluster 0 has not changed, the C0 entry 410 in snapshot 1 can point to C0 406 from snapshot 0. Because block 5 has changed, a new metadata structure can be allocated for the bits belonging to cluster 1, and the C1 entry 412 can be updated to point to the new metadata structure. The new metadata structure can include entries for blocks 4-7: B4 414, B5 416, B6 418, and B7 420. Each entry can identify where the data for that block is stored and whether that block has changed from an earlier snapshot. In this example, the entries for blocks 4, 6, and 7 can identify the first storage location and indicate that these blocks have not changed from snapshot 0. The entry for block 5 can identify the second storage location and that this block has changed from snapshot 0.

By only allocating storage when clusters have changed, the size of the metadata being maintained can be minimized Since there often are not many changes between clusters, the amount of storage needed for the metadata structure is reduced by only keeping track of the changed blocks and changed clusters. For example, if no additional changes have been made, then the current state 402 can include entries for cluster 0 and cluster 1, C0 422 and C1 424, which point back to the entries in the previous snapshot. If additional blocks in cluster 1 are changed, the metadata structure allocated for the blocks can be updated and the cluster entry can point back to that block metadata structure. If a block belonging to cluster 0 is changed, then a metadata structure for the blocks of cluster 0 can be allocated.

Although a single nested layer, from block to cluster, is shown, in various embodiments additional nested layers may be similarly implemented. For example, multiple clusters may be combined into a super cluster. The cluster metadata may be updated to reflect this additional layer with entries for each super cluster. When a block is changed, an entry for the corresponding cluster can be allocated, and entries for the blocks of that cluster can be allocated. Similarly, the cluster map can be updated to reflect the additional layer of super clusters.

Figure 5:
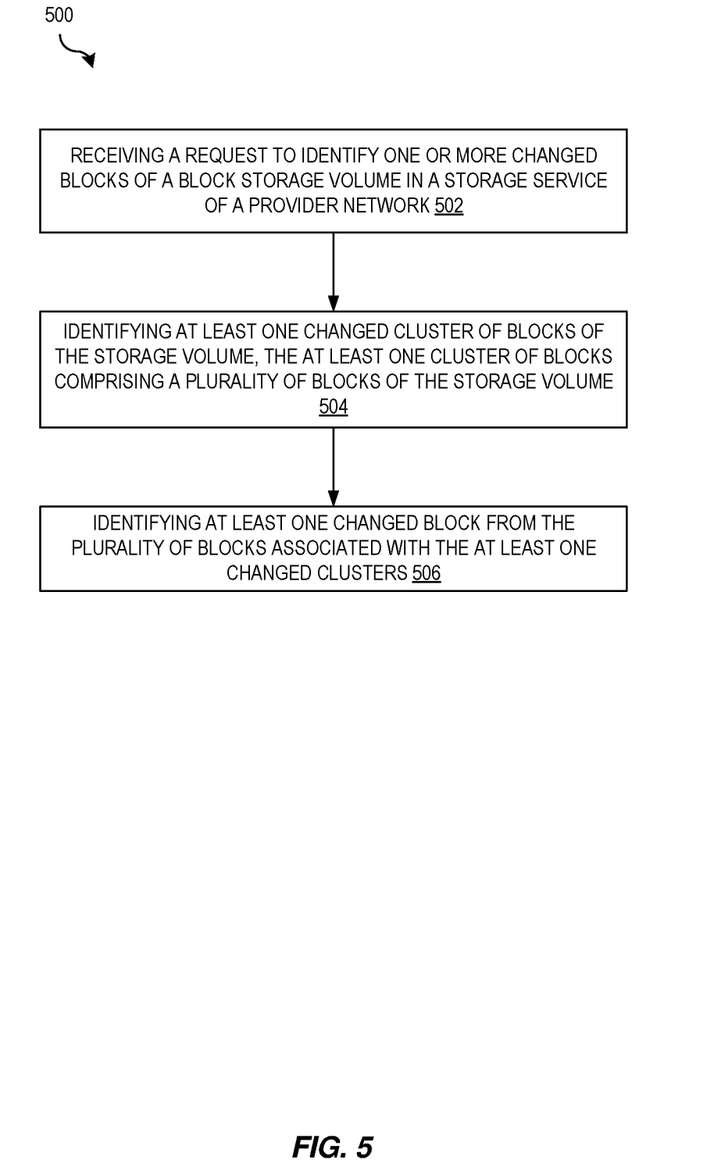
FIG. 5 is a flow diagram illustrating operations of a method for optimizing snapshot changed blocks metadata querying according to some embodiments.

FIG. 5 is a flow diagram illustrating operations 500 of a method for optimizing snapshot changed blocks metadata querying according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by storage service 102 of the other figures.

The operations 500 include, at block 502, receiving a request to identify one or more changed blocks of a block storage volume in a storage service of a provider network. In some embodiments, the request to identify the one or more changed blocks of the block storage volume identifies wherein the request to identify the one or more changed blocks of the block storage volume identifies a first snapshot of the storage volume to be compared to a current state of the storage volume. In some embodiments, the request to identify the one or more changed blocks of the block storage volume identifies a first snapshot of the storage volume, a second snapshot of the storage volume, and one or more block identifiers. In some embodiments, each block has a block size of four kilobytes. In some embodiments, the block storage volume includes a plurality of blocks organized into a plurality of clusters of blocks, wherein each cluster of blocks includes 1024-8192 blocks.

The operations 500 further include, at block 504, identifying at least one changed cluster of blocks of the storage volume, the at least one cluster of blocks comprising a plurality of blocks of the storage volume. The operations 500 further include, at block 506, identifying at least one changed block from the plurality of blocks associated with the at least one changed cluster. In some embodiments, the operations may further include returning at least one block identifier corresponding to the at least one changed block.

In some embodiments, the operations may further include receiving a request to perform a write on the storage volume, determining at least one block of the storage volume to store data associated with the write, updating at least one mapping associated with the at least one block to identify a storage location, storing the data associated with the write to the storage location, and updating cluster metadata indicating that the at least one block is changed.

In some embodiments, the cluster map comprises a queryable data structure which when queried using a block identifier returns a storage location of data associated with a block associated with the block identifier. In some embodiments, the cluster metadata includes a data structure indicating for each cluster whether that cluster has changed since an earlier state. In some embodiments, when a write is performed, a new data structure is allocated for the plurality of blocks associated with the at least one changed cluster, the new data structure indicating for each block in the at least one changed cluster whether that block has changed since an earlier state. In some embodiments, the operations may further comprise capturing a snapshot of the storage volume including the cluster map and the cluster metadata, wherein unchanged portions of the cluster metadata point to an earlier snapshot of the storage volume.

In some embodiments, the operations may include receiving an application programming interface (API) request to identify one or more changed blocks between a first snapshot of a block storage volume and a second snapshot of a block storage volume, the block storage volume provided by a storage service of a provider network, iterating over a plurality of clusters of blocks of the storage volume using a cluster metadata structure to identify one or more changed clusters, each cluster of blocks representing a plurality of blocks of the storage volume, for each of the one or more changed clusters, iterating over the plurality of blocks associated with each of the one or more changed clusters to identify one or more changed blocks, and returning one or more block identifiers corresponding to the one or more changed blocks. In some embodiments, the cluster metadata includes a bitmap indicating for each cluster whether that cluster has changed since a previous snapshot. In some embodiments, when a write is performed on the storage volume, a new bitmap is allocated for the plurality of blocks associated with the one or more changed clusters, the new bitmap indicating for each block in the one or more changed clusters whether that block has changed since the previous snapshot.

Figure 6:
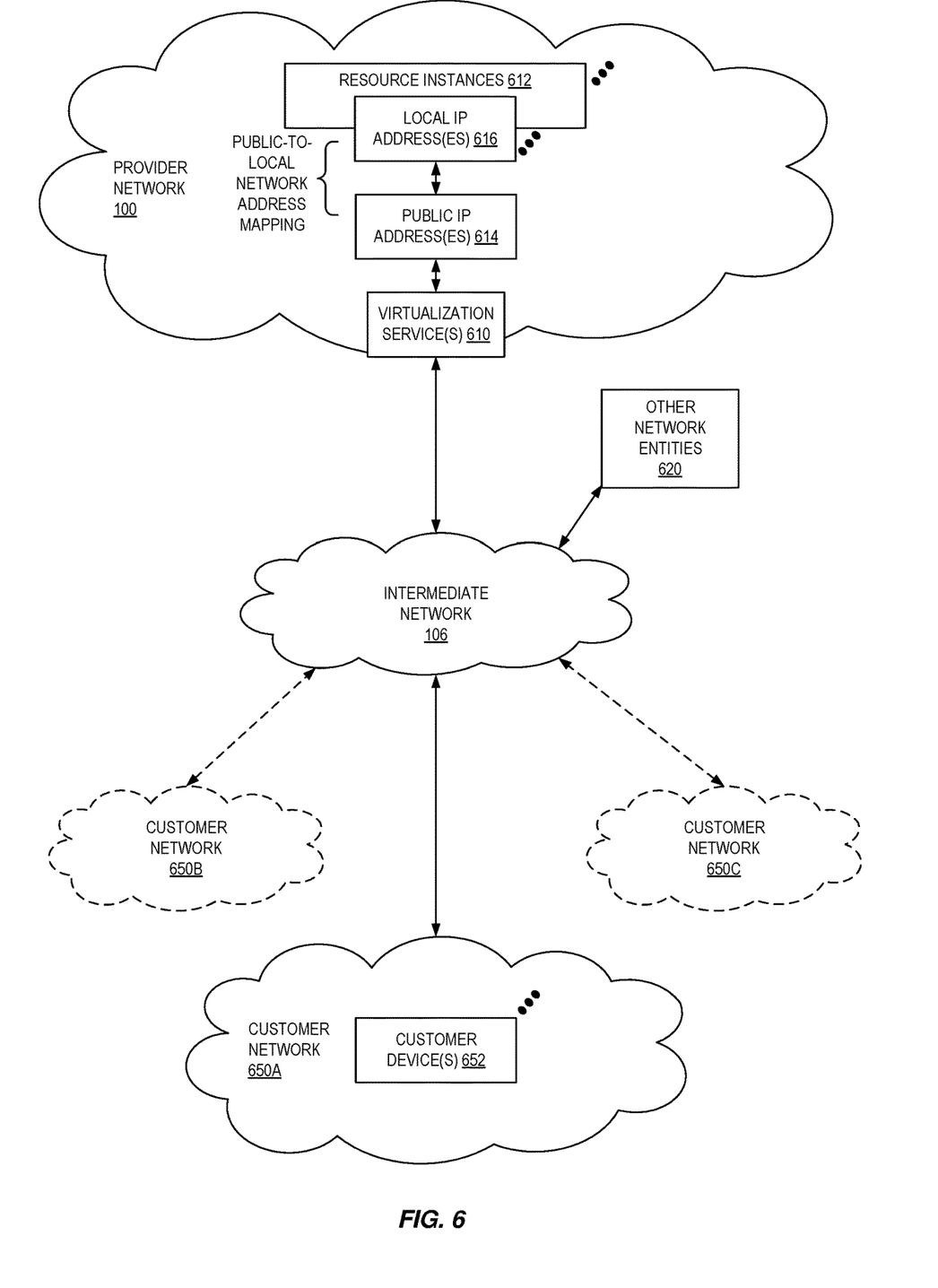
FIG. 6 illustrates an example provider network environment according to some embodiments.

FIG. 6 illustrates an example provider network (or "service provider system") environment according to some embodiments. A provider network 100 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 100. In some embodiments, the provider network 100 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 100, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 100 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 106, such as the Internet. Other network entities 620 on the intermediate network 106 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 106 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 100; a customer may then assign their allocated public IP addresses to particular resource instances allocated to the customer. These public IP addresses may be referred to as customer public IP addresses, or simply customer IP addresses. Instead of being assigned by the provider network 100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
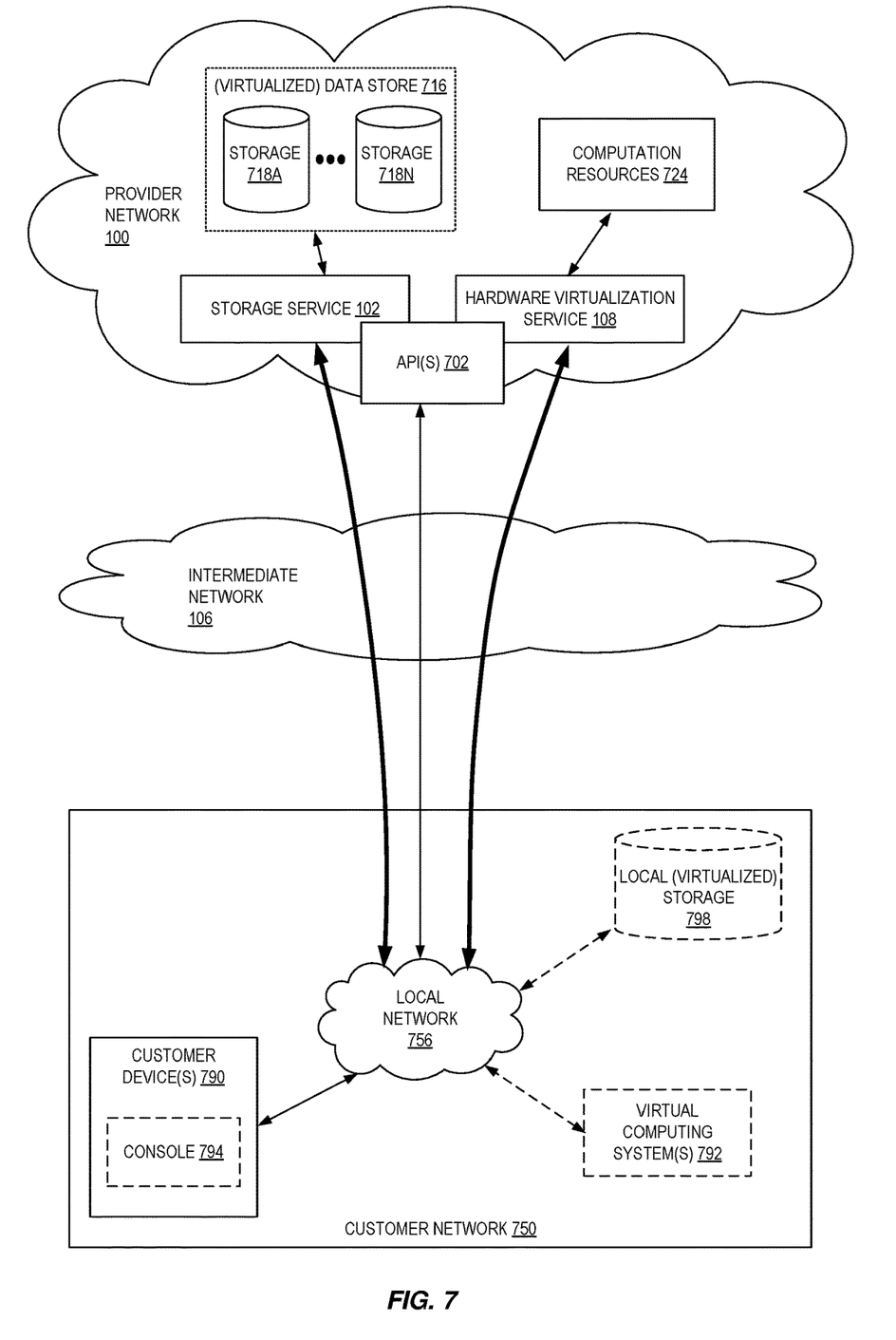
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 108 provides multiple computation resources 724 (e.g., VMs) to customers. The computation resources 724 may, for example, be rented or leased to customers of the provider network 100 (e.g., to a customer that implements customer network 750). Each computation resource 724 may be provided with one or more local IP addresses. Provider network 100 may be configured to route packets from the local IP addresses of the computation resources 724 to public Internet destinations, and from public Internet sources to the local IP addresses of computation resources 724.

Provider network 100 may provide a customer network 750, for example coupled to intermediate network 106 via local network 756, the ability to implement virtual computing systems 792 via hardware virtualization service 108 coupled to intermediate network 106 and to provider network 100. In some embodiments, hardware virtualization service 108 may provide one or more APIs 702, for example a web services interface, via which a customer network 750 may access functionality provided by the hardware virtualization service 108, for example via a console 794 (e.g., a web-based application, standalone application, mobile application, etc.). In some embodiments, at the provider network 100, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 102, for example via one or more APIs 702, to access data from and store data to storage resources 718A-718N of a virtual data store 716 (e.g., a folder or "bucket", a virtualized volume, a database, etc.) provided by the provider network 100. In some embodiments, a virtualized data store gateway (not shown) may be provided at the customer network 750 that may locally cache at least some data, for example frequently-accessed or critical data, and that may communicate with storage service 102 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 102 acting as a storage virtualization service, and these volumes may appear to the user as local (virtualized) storage 798.

While not shown in FIG. 7, the virtualization service(s) may also be accessed from resource instances within the provider network 100 via API(s) 702. For example, a customer, appliance service provider, or other entity may access a virtualization service from within a respective virtual network on the provider network 100 via an API 702 to request allocation of one or more resource instances within the virtual network or within another virtual network.

Illustrative Systems

Figure 8:
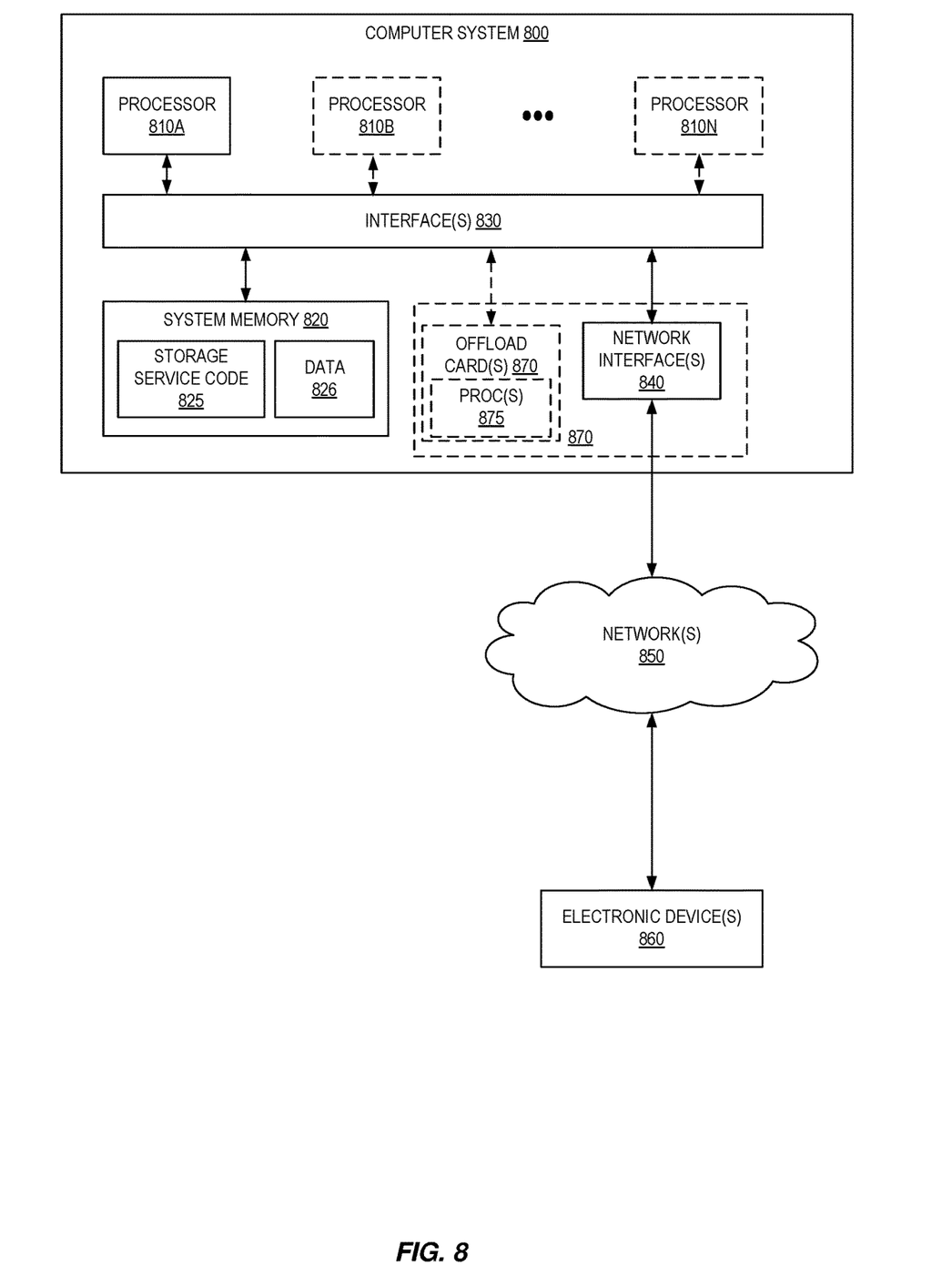
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as storage service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
capturing a first snapshot of a block storage volume provided by a storage service of a provider network;
capturing a second snapshot the block storage volume;
receiving an application programming interface (API) request to identify one or more changed blocks between the first snapshot of the block storage volume and the second snapshot of the block storage volume;
iterating over a plurality of clusters of blocks of the storage volume using a cluster metadata structure to identify one or more changed clusters, each cluster of blocks representing a plurality of blocks of the storage volume;
for each of the one or more changed clusters, iterating over the plurality of blocks associated with each of the one or more changed clusters to identify one or more changed blocks;
determining, using the cluster metadata structure, that an unchanged cluster of blocks of the plurality of clusters of blocks is unchanged between the first snapshot and the second snapshot, and wherein using the cluster metadata structure to determine that the unchanged cluster of blocks is unchanged between the first snapshot and the second snapshot is based at least in part on determining that a first portion of the cluster metadata structure points to a second portion of the cluster metadata structure, the first portion representing the unchanged cluster of blocks at the second snapshot and the second portion representing the unchanged cluster of blocks at the first snapshot; and
returning one or more block identifiers corresponding to the one or more changed blocks.

2. The computer-implemented method of claim 1, wherein the cluster metadata includes a bitmap indicating for each cluster whether that cluster has changed since a previous snapshot.

3. The computer-implemented method of claim 1, wherein when a write is performed on the storage volume, a new bitmap is allocated for the plurality of blocks associated with the one or more changed clusters, the new bitmap indicating for each block in the one or more changed clusters whether that block has changed since a previous snapshot.

4. A computer-implemented method comprising:
capturing a first snapshot of a block storage volume provided by a storage service of a provider network;
capturing a second snapshot the block storage volume;
receiving a request to identify one or more changed blocks of the block storage volume that changed between the first snapshot and a current state of the block storage volume;
identifying, using cluster metadata for the block storage volume, at least one changed cluster of blocks of the block storage volume that changed between the first snapshot and the current state, the at least one changed cluster of blocks comprising a plurality of blocks of the block storage volume;
determining, using cluster metadata, that an unchanged cluster of blocks of the block storage volume is unchanged between the first snapshot and the current state, wherein the determining that the unchanged cluster of blocks is unchanged between the first snapshot and the current state is based at least in part on using cluster metadata to determine that the unchanged cluster of blocks is unchanged between the first snapshot and the second snapshot, and wherein using cluster metadata to determine that the unchanged cluster of blocks is unchanged between the first snapshot and the second snapshot is based at least in part on determining that a first portion of cluster metadata points to a second portion of cluster metadata, the first portion representing the unchanged cluster of blocks at the second snapshot and the second portion representing the unchanged cluster of blocks at the first snapshot; and
identifying at least one changed block from the plurality of blocks associated with the at least one changed cluster as changed between the first snapshot and the current state.

5. The computer-implemented method of claim 4, further comprising:
receiving a request to perform a write on the block storage volume;
determining at least one block of the block storage volume to store data associated with the write;
updating at least one mapping associated with the at least one block to identify a storage location;
storing the data associated with the write to the storage location; and
updating cluster metadata indicating that the at least one block is changed.

6. The computer-implemented method of claim 4, wherein cluster metadata comprises a queryable data structure which when queried using a block identifier returns a storage location of data associated with a block associated with the block identifier.

7. The computer-implemented method of claim 4, wherein cluster metadata includes a data structure indicating for each cluster whether that cluster has changed since an earlier state.

8. The computer-implemented method of claim 4, wherein when a write is performed, a new data structure is allocated for the plurality of blocks associated with the at least one changed cluster, the new data structure indicating for each block in the at least one changed cluster whether that block has changed since an earlier state.

9. The computer-implemented method of claim 4, wherein unchanged portions of cluster metadata point to an earlier snapshot of the block storage volume.

10. The computer-implemented method of claim 4, wherein the request to identify the one or more changed blocks of the block storage volume identifies the first snapshot of the block storage volume and the one or more block identifiers.

11. The computer-implemented method of claim 4, further comprising:
returning at least one block identifier corresponding to the at least one changed block.

12. The computer-implemented method of claim 4, wherein each block has a block size of four kilobytes.

13. The computer-implemented method of claim 4, wherein the block storage volume includes a plurality of blocks organized into a plurality of clusters of blocks, wherein each cluster of blocks includes 1024-8192 blocks.

14. A system comprising:
a first one or more electronic devices to implement a hardware virtualization service in a multi-tenant provider network; and
a second one or more electronic devices to implement a storage service in the multi-tenant provider network, the storage service including instructions that upon execution cause the storage service to:
capture a first snapshot of a block storage volume provided by the storage service of the multi-tenant provider network;
capture a second snapshot the block storage volume;
receive a request to identify one or more changed blocks of the block storage volume that changed between the first snapshot and a current state of the block storage volume;
identify, using cluster metadata for the block storage volume, at least one changed cluster of blocks of the block storage volume that changed between the first snapshot and a current state of the block storage volume, the at least one changed cluster of blocks comprising a plurality of blocks of the block storage volume;
determine, using cluster metadata, that an unchanged cluster of blocks of the block storage volume is unchanged between the first snapshot and the current state, wherein to determine that the unchanged cluster of blocks is unchanged between the first snapshot and the current state the storage service includes instructions that upon execution cause the storage service to use cluster metadata to determine that the unchanged cluster of blocks is unchanged between the first snapshot and the second snapshot, and wherein to determine that the unchanged cluster of blocks is unchanged between the first snapshot and the second snapshot the storage service includes instructions that upon execution cause the storage service to determine, using cluster metadata, that a first portion of cluster metadata points to a second portion of cluster metadata, the first portion representing the unchanged cluster of blocks at the second snapshot and the second portion representing the unchanged cluster of blocks at the first snapshot; and
identify at least one changed block from the plurality of blocks associated with the at least one changed cluster.

15. The system of claim 14, wherein the instructions, when executed, further cause the storage service to:
receive a request to perform a write on the block storage volume;
determine at least one block of the block storage volume to store data associated with the write;
update at least one mapping associated with the at least one block to identify a storage location;

store the data associated with the write to the storage location; and update cluster metadata indicating that the at least one block is changed.

16. The system of claim 14, wherein cluster metadata comprises a queryable data structure which when queried using a block identifier returns a storage location of data associated with a block associated with the block identifier.

17. The system of claim 14, wherein cluster metadata includes a data structure indicating for each cluster whether that cluster has changed since an earlier state.

18. The system of claim 14, wherein when a write is performed, a new data structure is allocated for the plurality of blocks associated with the at least one changed cluster, the new data structure indicating for each block in the at least one changed cluster whether that block has changed since an earlier state.

19. The system of claim 14, wherein the instructions, when executed, further cause the storage service to:

capture a snapshot of the storage volume including cluster metadata, wherein unchanged portions of cluster metadata point to an earlier snapshot of the block storage volume.

* * * * *